Dec. 26, 1944.  B. N. WALLIS  2,365,669
AIRCRAFT WING AND OTHER CONTROL SURFACE OF STRESSED-SKIN TYPE
Filed June 8, 1942  2 Sheets-Sheet 2
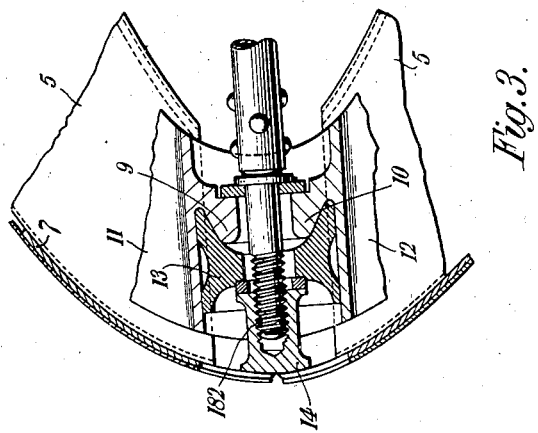
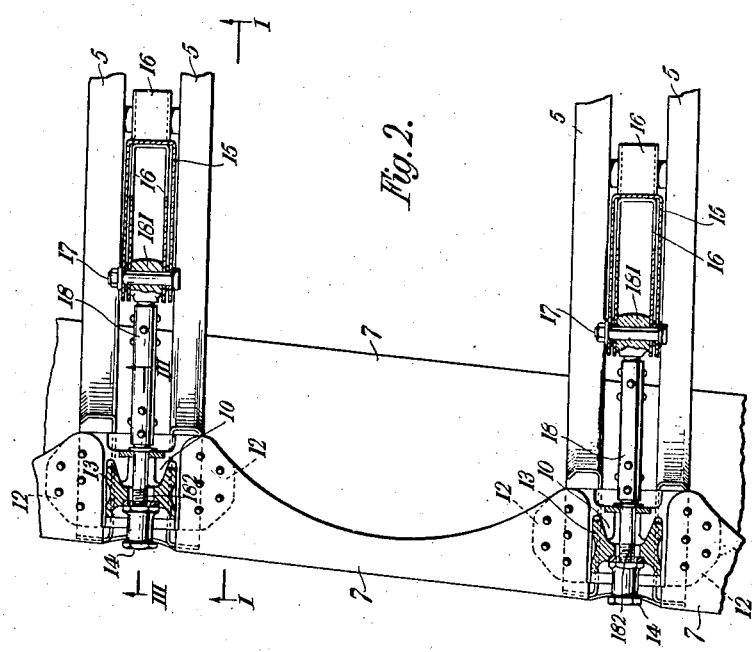
INVENTOR
Barnes Neville Wallis
BY
Loyd Hall Sutton
ATTORNEY Patented Dec. 26, 1944

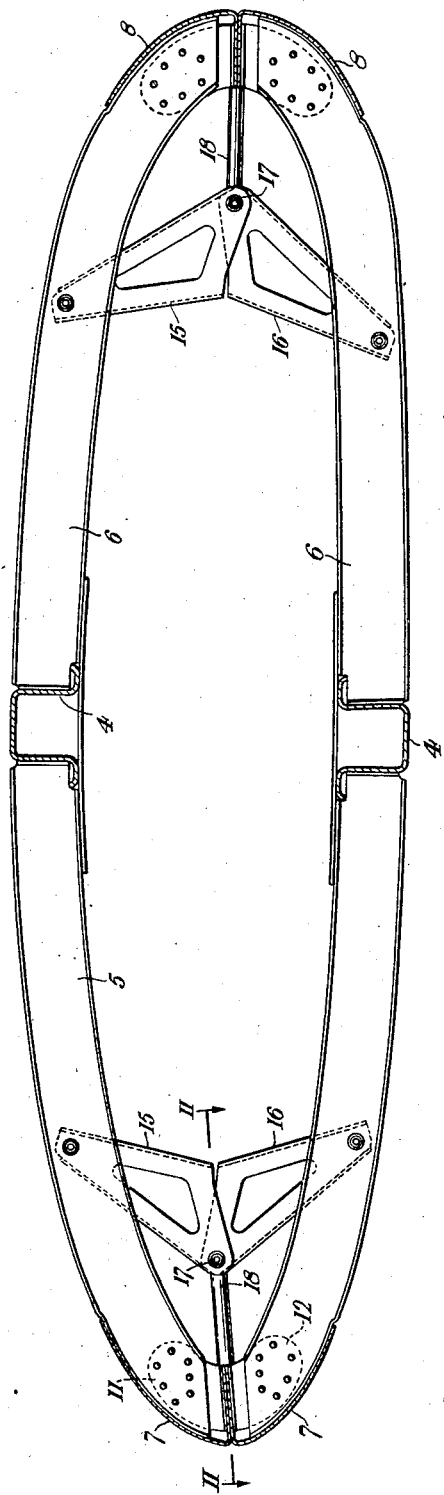

2,365,669

UNITED STATES PATENT OFFICE 2,365,669

AIRCRAFT WING AND OTHER CONTROL SURFACES OF THE STRESSED-SKIN TYPE

Barnes Neville Wallis, Weybridge, England, assignor to Vickers-Armstrongs Limited, London, England Application June 8, 1942, Serial No. 446,236
In Great Britain March 28, 1941

5 Claims. (Cl. 244—123)

The invention has reference to aircraft wings and control surfaces of the stressed-skin type, comprising two independently constructed longitudinal sections connected at their edges, as typified by British Patent Specification No. 478,089, and the object of the invention is to provide an improved form of reinforcement whereby such structures may be braced internally to withstand the tendency of their constituent sections to burst apart in certain critical operational conditions, as during a steep dive, when both upper and lower faces of a wing may be subjected to relatively high negative pressures.

According to the invention, an aircraft wing or other control surface of the said kind comprises articulated inter-section bracing members and means, operable from the exterior of the structure after the sections thereof have been assembled, for moving the point of articulation of the bracing members to or fro in toggle-fashion and so draw the sections together or force them apart.

Said bracing members may each comprise a pair of toggle-levers respectively pivoted to the sections of the structure and connected at their free ends to a common operating member adapted to be moved endwise in the plane of oscillation of said levers. The arrangement may be such that the operating member can be inserted between the edges of the sections of the structure before the same are brought completely together, and engaged with the free ends of the toggle-levers, the operation of bracing the toggle being performed after final assembly of the sections of the structure.

One embodiment of the invention, as applied to an aircraft stressed-skin wing is illustrated in, and is hereinafter described with reference to, the accompanying drawings. Fig. 1 of the drawings is a transverse section taken on the line I—I of Fig. 2, of the structural parts of the wing, the skin and the fairing and falsework at the trailing edge being omitted. Fig. 2 is a fragmentary sectional view, drawn to a larger scale, as though taken on the line II—II of Fig. 1, and Fig. 3 is a detailed sectional view, drawn on a still larger scale, as though taken on the line III—III of Fig. 2, depicting separately the manner in which the means employed to connect the edges of the upper and lower sections of the wing are utilised to serve simultaneously to tighten the toggle-operating member of the wing-bracing provided in accordance with the present invention.

The wing exemplified in the drawings is made in two sections each of which forms a surface of the structure and is constructed separately as an independent unit. One section provides the upper wing-surface and the other section the lower wing-surface, and each section incorporates a longitudinal spar 4, fore and aft part-ribs 5 and 6, respectively, and longitudinal stiffening members 7 and 8, of shaped-channel section along the leading and trailing edges. Collectively, the two longitudinal spars 4 constitute the main spar of the wing. The abutting edges of the two sections of the illustrated wing are connected by means comprising annular male conical members, the divided halves 9 and 10 whereof are formed integrally with bracket-like members 11 and 12 respectively riveted to the stiffening-members 7 and 8, and to the opposed ends of the ribs 5 and 6, each component pair of said male conical members 9, 10 being tightened together by means of a female conical collar 13 which is forced over the members 9 and 10 by means of the nut 14.

The said two wing-sections are respectively furnished interiorly with a series of inwardly projecting levers 15 and 16 pivoted one each upon one of the ribs 5, 6, said levers 15, 16 being conveniently made in the form of a triangular truss of which one extremity is mounted upon one of said pivots. The sum of the effective lengths of each opposite pair of levers 15, 16 is somewhat greater than the distance by which their respective pivots are separated when the wing-sections are assembled in the closed position, so that the inwardly directed extremities of said levers are able to overlap slightly as shown, permitting them to be connected in pivotal fashion by a bolt 17 passing through apertures drilled therein. The said bolt is utilised to form a pivot for the hollow T-shaped head 181 of a rod 18 of which the shank extends more or less in the central plane of the wing through the orifice enclosed by the annular male conical members 9, 10, hereinbefore referred to. The shanks of the rods 18 are screw-threaded as shown at 182 so as to serve to receive the nuts 14 by which the female cones 13 are tightened upon the male cones 9, 10, and the arrangement is such that the operation of tightening said nuts 14 serves simultaneously to withdraw the rods 18 endwise towards the edge of the wing. This action has the effect of drawing the common pivots of all the levers 15, 16 in toggle fashion in the same direction, thereby bringing the upper and lower wing-sections together and so bracing the latter when the nuts 14 are finally tightened as to reinforce them against the disruptive suctional forces which are developed on their surfaces in certain critical conditions, the tightening of the cooperating conical members 9, 10 and 13 completing the connection of the wing edges. As will be understood, the release of the nuts 14 will permit the rods 18 to be pushed endwise into the wing after the female cones 13 have been removed, thus moving the upper and lower wing-sections apart for the purpose of disassembly.

When assembling the wing-sections it is convenient to insert the rods 18 with their inner T-shaped ends 181 correctly placed between the apertures in the overlapped ends of the toggle-levers 15, 16, before the wing-sections are brought close together. The bolts 17 can then be inserted to complete the pivotal connections of the rods 18 to the toggle-levers 15 and 16, after which the rods 18 can be drawn outwardly so as to draw the wing-sections together and, when the edges thereof are in abutment, the female cones 13 are tightened and the bracing of the wing completed.

Where this form of toggle-bracing is used in wing or other structures of which the edges are connected and secured by some means other than that hereinbefore described, it will be necessary to provide an abutment about the aperture in the structure through which the toggle-rod 18 projects, against which the nut employed to withdraw said rod may bear, when operating the toggle-levers 15, 16.

The bracing arrangement herein described is particularly suited to the construction of aircraft wings which are intended to house fuel tanks, partly owing to the fact that the toggle braces can be arranged near to the edges of the wings, leaving the major portion of the wing at its deepest part unobstructed by structural parts which would interfere with the installation of the tanks, and also because a flexible tank can be arranged to press outwardly against the toggle-levers 15, 16, and so maintain them in the braced position in the event of the destruction of the toggle-rod 18 by gunfire or otherwise.

What I claim as my invention and desire to secure by Letters Patent is:

1. A basic structural framework for an aircraft wing or other control surface structure of the stressed-skin type comprising two longitudinal sections each forming a surface of the structure, said sections being formed as separate units, and means for rigidly connecting said sections along their longitudinal edges comprising pairs of jointed toggle members, one member of each pair being pivoted to one of said sections, a screw-threaded rod pivoted to each toggle joint, a nut threaded on said rod, and an abutment for said nut constituted at the adjoining edges of the assembled sections of the structure.

2. A basic structural framework for an aircraft wing or other control surface structure of the stressed-skin type, comprising two longitudinal sections each forming a surface of the structure, said sections being formed as separate units, a plurality of two-part annular male conical members of which the respective complementary parts are fixed to the opposing edges of said sections, a female conical collar embracing the parts of such male conical member, pairs of jointed toggle members of which one of each pair is pivoted to one of said sections, a screw-threaded rod pivoted to each toggle joint and disposed so as to project from the structure through one of the aforesaid annular male conical members, and a nut threaded on said rod and arranged on being tightened to bear against the face of the female conical member so as to brace the toggle and tighten the structural sections together simultaneously.

3. A basic structural framework for an aircraft wing or other control surface structure of the stressed-skin type comprising two longitudinal sections each forming a surface of the structure, said sections being formed as separate units, and means for rigidly connecting said sections together along their longitudinal edges comprising a series of bracing struts pivoted to the interior of each such section, the struts of one series being pivotally jointed at their free ends to the struts of the other series, a rod pivotally connected to each pair of struts at said last named joints and passing through an aperture between the adjoining edges of the sections, a screw-thread on said rod, and a nut threaded on said screw-thread and adapted when tightened to move the rod endwise and brace the wing-sections together.

4. A basic structural framework for an aircraft wing or other control surface structure of the stressed-skin type comprising two longitudinal sections each forming a surface of the structure, said sections being formed as separate units, and means for rigidly connecting said sections together along their longitudinal edges comprising two series of bracing struts pivoted to the interior of each such section in proximity to the leading and trailing edges thereof respectively, the struts of the two leading-edge series being pivotally connected at their free ends and the struts of the two trailing-edge series being likewise pivotally connected at their free ends, a rod pivotally connected to each pair of struts at said last named joints and passing through an aperture between the adjoining edges of the sections, a screw-thread on said rod, and a nut threaded on said screw-thread and adapted when tightened to move the rod endwise and brace the wing-sections together.

5. A basic structural framework for an aircraft wing or other control surface structure of the stressed-skin type comprising two longitudinal sections each forming a surface of the structure, said sections being formed as separate units, each such section including a main longitudinal spar, part-ribs attached fore and aft thereof and longitudinal stiffening members attached between said part-ribs along the leading and trailing edges of the section, and means for rigidly connecting said sections along said leading and trailing edges comprising pairs of articulated levers respectively pivoted to opposite part-ribs, each such pair of levers being pivotally connected to constitute a toggle, and an operating member connected to each toggle joint adapted to move endwise in the plane of oscillation thereof, said operating member being accessible for actuation from outside the structure after assembly of its sections.

BARNES NEVILLE WALLIS.